United States Patent [19]

Himes et al.

[11] Patent Number: 4,880,878

[45] Date of Patent: Nov. 14, 1989

[54] BLOCK COPOLYMER BLENDS WITH IMPROVED OIL ABSORPTION RESISTANCE

[75] Inventors: Glenn R. Himes, Houston; Andrea Sanders, Katy, both of Tex.

[73] Assignee: Shell Oil Company, Houston, Tex.

[21] Appl. No.: 138,780

[22] Filed: Dec. 29, 1987

[51] Int. Cl.$^4$ ............................................. C08L 53/02
[52] U.S. Cl. .................................... 525/89; 525/98; 525/314; 525/914
[58] Field of Search .................................... 525/89, 914

[56] References Cited

U.S. PATENT DOCUMENTS

| | | | |
|---|---|---|---|
| Re. 27,145 | 6/1971 | Jones ................................ | 260/880 |
| 3,113,986 | 12/1963 | Breslow et al. ................... | 260/683.9 |
| 3,251,905 | 5/1966 | Zelinski ............................ | 260/879 |
| 3,299,174 | 1/1967 | Kuhre et al. ..................... | 260/876 |
| 3,390,207 | 6/1968 | Moss et al. ....................... | 260/879 |
| 3,424,649 | 1/1969 | Nyberg et al. ................... | 161/253 |
| 3,459,830 | 8/1969 | Legge et al. ..................... | 260/876 |
| 3,576,913 | 4/1971 | Johnson et al. .................. | 260/880 |
| 3,598,877 | 8/1971 | Fountain et al. ................. | 260/666 A |
| 3,661,826 | 5/1972 | Meier ................................ | 260/28.5 |
| 3,686,365 | 8/1972 | Sequeira ........................... | 260/876 B |
| 3,686,366 | 8/1972 | Winkler ............................ | 260/880 B |
| 3,700,748 | 10/1972 | Winkler ............................ | 260/879 |
| 3,756,977 | 9/1973 | Yoshimoto et al. .............. | 260/33.6 AQ |
| 3,772,234 | 11/1973 | Porter ............................... | 260/28.5 |
| 3,776,981 | 12/1973 | Winkler et al. .................. | 260/880 B |
| 3,810,957 | 5/1974 | Lunk ................................. | 260/876 B |
| 3,830,880 | 8/1974 | De LaMare ...................... | 260/879 |
| 3,965,019 | 6/1976 | St. Clair et al. ................. | 252/59 |
| 4,006,116 | 2/1977 | Dominguez ....................... | 525/89 |
| 4,117,037 | 9/1978 | Himes ............................... | 260/880 |
| 4,219,627 | 8/1980 | Halasa et al. .................... | 525/89 |
| 4,226,952 | 10/1980 | Halasa et al. .................... | 525/192 |
| 4,292,414 | 9/1981 | Saito et al. ....................... | 525/255 |
| 4,412,087 | 10/1983 | Trepka ............................. | 585/12 |
| 4,578,429 | 3/1986 | Gergen et al. ................... | 525/291 |
| 4,769,415 | 9/1988 | Hotta et al. ...................... | 525/89 |

FOREIGN PATENT DOCUMENTS

| | | | |
|---|---|---|---|
| 58-204037 | 11/1983 | Japan . | |
| 1176654 | 8/1986 | Japan ................................ | 525/89 |
| 1230507 | 5/1971 | United Kingdom ............ | 197/66 R |

*Primary Examiner*—Wilbert J. Briggs, Sr.
*Attorney, Agent, or Firm*—Keith M. Tackett

[57] ABSTRACT

A thermoplastic blend with the ability to absorb less than 40% of an oil, and having a superior tensile strength comprises about 80 to about 20 phr of an elastomeric block copolymer having the general configuration A-B-A, wherein the B block is a butadiene hydrocarbon block consisting of about 35 to about 55 mole percent of condensed butadiene units in the 1,2 configuration, and about 20 to about 80 phr of a block copolymer having the general configuration A-B-A, wherein the B block is a hydrogenated butadiene hydrocarbon block consisting of about 18 to about 34 mole percent of condensed butadiene units in the 1,2 configuration.

6 Claims, No Drawings

BLOCK COPOLYMER BLENDS WITH IMPROVED OIL ABSORPTION RESISTANCE

BACKGROUND OF THE INVENTION

The invention relates to block copolymer blends having a superior combination of physical properties, particularly improved resistance to oil absorption and improved tensile strength. More particularly, the invention is directed to blends of hydrogenated block copolymers having few side chains on the elastomeric midblocks and block copolymers having higher amounts of side chains on the midblocks.

The block copolymers usable within the scope of the invention include those having a configuration A-B-A. Block copolymers of the A-B-A configuration are known, see U.S. Patent No. Reissue 27,145, which discloses, among other polymers, block copolymers having an A-B-A configuration wherein the two terminal blocks A comprise thermoplastic polymer blocks of a vinyl arene such as polystyrene(s), and the mid-block, block B, is a polymer block of a selectively hydrogenated conjugated diene such as hydrogenated polybutadiene (EB) or hydrogenated polyisoprene (EP). The proportion of the thermoplastic terminal blocks to the center elastomeric polymer block, the relative molecular weight of each of these blocks, and the number of side chains on the B blocks is balanced to obtain a rubber having a combination of properties, such that it behaves as a vulcanized rubber without requiring the actual step of vulcanization.

Hydrogenation may be effected selectively on the B blocks when desired, as disclosed in U.S. Patent No. Reissue 27,145. The '145 patent describes a block copolymer wherein each A block is a polymerized monoalkenyl aromatic hydrocarbon block having an average molecular weight of about 4,000 to 115,000; and each B block is a polymerized butadiene hydrocarbon block having an average molecular weight of about 20,000 to 450,000. Further, each A block constitutes from 2 to 33 weight percent of the copolymer, and each B block preferably contains from 35 to to 55 mole percent of condensed butadiene units in a 1,2 configuration, a measured by a standard NMR technique. Finally, the unsaturation of the B blocks is preferably reduced to less than 10% of the unsaturation of the non-hydrogenated polymer.

While hydrogenated block copolymers having from 35–55% of the polybutadiene in the 1,2-configuration have a number of outstanding technical advantages as described in Reissue 27,145, one of their principal limitations lies in their ability to absorb oil which can significantly reduce tensile strength. The ability of the block copolymer to absorb oil is essentially due to its non-crystalline hydrocarbon character which is not materially changed by hydrogenating the copolymer when greater than 35% of the polybutadiene is in the 1,2 configuration.

The Reissue Patent No. 27,145 also teaches the composition and tensile properties of block copolymer having less than 35% of the polybutadiene in the 1,2 configuration. However, these compositions were considered to be too stiff probably due to crystallization of the B blocks.

TERMS

The term "phr" throughout refers to parts by weight per hundred parts by weight of the total elastomeric block copolymer.

SUMMARY OF THE INVENTION

The present invention includes a thermoplastic blend comprising:

(a) about 80 to about 20 parts by weight of an elastomeric block copolymer having the general configuration A-B-A, wherein:

(i) each A block is a polymerized monoalkenyl aromatic hydrocarbon block having an average molecular weight of about 4000 to about 115,000;

(ii) the A blocks, in combination, comprise about 5 to about 35 w % of the elastomeric block copolymer; and (iii) each B block is a polymerized butadiene hydrocarbon block consisting of about 8 to about 55 mole percent condensed butadiene units in the 1,2 configuration, and said B block has an average molecular weight of between about 20,000 and about 450,000; and (b) about 20 to about 80 parts by weight of a block copolymer having the general configuration A-B-A wherein:

(i) each A block is a polymerized monoalkenyl aromatic hydrocarbon block having an average molecular weight of about 4000 to about 115,000;

(ii) said A blocks, in combination, comprise about 5 to about 35 w % of the block copolymer;

(iii) each B block is a polymerized butadiene hydrocarbon block consisting of about 18 to about 34 mole percent condensed butadiene units in the 1,2 configuration, and said B block has an average molecular weight of between about 20,000 and about 450,000; and (iv) the B blocks are hydrogenated to an unsaturation that is less than about 5% of the original unsaturation.

The blend shows improved oil absorption resistance and superior tensile strength in comparison to the elastomeric block copolymer component alone. The addition of small amounts of a polyolefin such as polyethylene improves the resistance to oil absorption.

DETAILED DESCRIPTION OF THE INVENTION

Oil absorption for elastomeric block copolymers having 35 to 55w % of the hydrogenated butadiene units in the 1,2 configuration is about 50–100%. The following table, Table 1, illustrates the correlation of the configuration of the polybutadiene units to both resistance to oil absorption and improved tensile strength for S-EB-S (styrene-hydrogenated butadiene-styrene) copolymers.

TABLE 1

| Block Copolymer | Hydrogenated Polybutadiene 1,2 Content (w %) | Oil[1] Absorption (w %) 16 HR at Room Temp. | Tensile Strength[2] (in psi) |
| --- | --- | --- | --- |
| A | 42.5 | 84 | 1150 |
| B | 30.7 | 30 | 3950 |
| C | 23.0 | 8.8 | 4025 |

[1] Johnson & Johnson Baby Oil.
[2] Tested on pure polymer, zero oil content.

The present invention provides a thermoplastic blend including A-B-A block copolymers which exhibit an increased resistance to oil absorption (most preferably in the range of about 4% to about 30% absorbance at ambient temperatures), and improved tensile strength by blending together elastomeric A-B-A block copolymers, having either 35 to 55 mole percent of hydrogenated butadiene midblocks or 8 to 55 mole percent of non-hydrogenated butadiene midblocks in the 1,2 configuration, and A-B-A block copolymers having about 18 to 34 mole percent, preferably about 21 to about 31 mole percent, of hydrogenated butadiene midblocks in the 1,2 configuration.

Contemplated uses for the blend of the high 1,2 content block copolymer and low 1,2 content block copolymer are the following:

Wax flexibilizing;

Impact resistance in blends with other polymers;

Oil resistant films and fibers, i.e., for diapers and other clothing;

Oil resistant automobile components;

High tensile strength, oil-resistant wire and cable compounds;

Blends of wax-based antiozonants for diene rubbers, for use in dynamic applications;

Stress-crack inhibitors for polyethylene;

Higher strength coextrusion tie layers with improved compatibility with polyolefin substrates;

Tear resistant polyethylene film;

Various oil resistant applications, including hoses, boots, shoe soles, and similar items; and Gels—the blend will form gels at very low concentrations.

In order to have the most desirable properties of the novel hydrogenated block copolymer blend, it is preferred to form the block copolymers with the general configuration A-B-A, wherein the terminal blocks A have average molecular weights of between about 4,000 and about 115,000, more preferably between about 4,000 and about 35,000, and the mid-block B has an average molecular weight of between about 20,000 and about 450,000, more preferably between about 50,000 and about 200,000. In order to promote the optimum combination of physical properties, it is desirable that the terminal blocks A comprise between about 5 and about 35% by weight of the total block copolymers, most preferably between about 8 and about 35% by weight of the block copolymer.

The block polymer's non-elastomeric end blocks can comprise homopolymers of copolymers preferably prepared from alkenyl aromatic hydrocarbons, and more particularly prepared from vinyl aromatic hydrocarbons. If a vinyl aromatic hydrocarbon is used, the aromatic hydrocarbon may be either monocyclic or polycyclic. Typical monomers usable within the scope of the invention can include styrene, α-methylstyrene, p-methylstyrene, tert-butylstyrene, vinyl xylene, ethyl vinyl xylene, and the like. The most preferred monomer is styrene. Mixtures of monomers, such as styrene and α-methylstyrene, may be utilized in place of the above-mentioned homopolymers or copolymers. The two "A" end blocks may be identical or different, so long as they meet the generic description of these types of end blocks, insofar as their thermoplastic character is concerned and as differentiated from the elastomeric portion of the mid-block or center "B" block.

The preferred conjugated diene for the midblock is 1,3-butadiene for both components of the blend.

The block copolymers may be produced by any well-known block polymerization or copolymerization procedure, for example, the sequential addition of monomer technique, the incremental addition of monomer technique, or the monomer coupling technique as illustrated in U.S. Pat. Nos. 3,251,905; 3,390,207; 3,598,887 and 4,219,627, the disclosures of which are herein incorporated by reference.

It should be observed that the above-described polymers and copolymers may be readily prepared by the methods set forth herein. However, it may be preferred to use commercially available block polymers. If commercially available block polymers are used, the number of processing steps involved in preparing the novel blends is reduced.

The catalysts employed in the process of the present invention may be defined broadly as "lithium based initiators" with alkyl lithium initiators as the preferred initiator. Other suitable initiators include lithium metal and aryl lithium compounds, and in certain instances, dilithium initiators such as dilithium stilbene, lithium 1-diphenyl ethylene or lithium naphthalene. Alkyl lithium initiators, the most preferred class of initiators, may be generally divided into normal alkyl lithiums and branched alkyl lithiums, the latter having a number of functional aspects making them more desirable than the former. Branched alkyl lithium initiators exhibit no disadvantageous "induction period" in the start up of the polymerization and can be used within the scope of the invention. The rate of polymerization is reasonably rapid but sufficiently steady so that it can be controlled and result in products having a relatively narrow molecular weight range.

The most preferred polymerization process to produce the block copolymers used in the novel blend utilizes polymerization at temperatures in the range of about 20° C. to about 100° C., preferably between about 20° C. and about 75° C. The proportion of initiators will depend upon the molecular weight of the products desired, but may be varied between about 1 and about 200 parts per million based on the the weight of the monomers involved and based on which monomers are involved.

The basis polymerization process for producing the block copolymer using the lithium-based catalysts comprises forming a solution of a first alkenyl arene monomer in an inert hydrocarbon such as alkanes, alkenes or cycloalkanes modified by the presence of the polar compounds of the group consisting of ethers, thioethers and tertiary amines. The polar compounds control the configurations of the butadiene midblocks with higher amounts of the polar compounds providing more butadiene units in the 1,2 configuration. With many initiators, the presence of a polar compound is not essential in the formation of the terminal polymer blocks. Consequently, a polar compound may be introduced just prior to or simultaneously with the addition of butadiene used for the formation of the elastomeric midblock. Among the polar compounds which may be added in accordance with the invention are dimethyl ether, diethyl ether, ethyl methyl ether, ethyl propyl ether, dioxane, orthodimethyoxybenzene, 1,2-diethyoxy ethane, 1-n-butoxy-2 ethoxy-ethane, dibenzyl ether, diphenyl ether, dimethyl sulfide, diethyl sulfide, tetramethylene oxide (tetrahydrofuran), tripropyl amine, tributyl amine, trimethyl amine, triethyl amine, pyridine and quinoline. Mixtures of these polar compounds also may be employed in the practice of the present invention.

When the lithium initiator, polar compound, alkenyl aromatic monomer and inert hydrocarbon are combined, polymerization proceeds to produce the first terminal polymeric block A, having an average molecular weight between about 4,000 and about 115,000. This A block is terminated on one end with a lithium radical and this end is commonly referred to as a "living polymer". At this time, without further alteration or removal of this lithium radical, butadiene is injected into the system and block polymerization occurs, the amount of the polar compound is important in producing the desired degree of branching of the polybutadiene block. The temperature, the initiator concentration and the solvent may be adjusted at this time to optimize the desired degree of polymerization of rate of reaction. The resulting product is then typified by the general structure A-B-Li, a living polymer block of the two monomers thus far employed. After this, a second addition of an alkenyl aromatic hydrocarbon is made to produce the final terminal block "A", or a coupling agent is used, and results in the formation of a three block system A-B-A. The polymerization process is terminated by a polar terminator, such as an alcohol, when appropriate.

Having obtained block polymers with the described degrees of branching in the center elastomeric butadiene polymer block, the next necessary stage for the low 1,2 content component having 18 to 34 mole percent of the hydrogenated butadiene units in the 1,2 configuration is to hydrogenate the polymer in order to increase its crystallinity. The high 1,2 content component having 35 to 55 mole % of the butadiene units in the B block in the 1,2 configuration may also be hydrogenated to increase the service temperature and at the same time to improve the oxidation stability of the product. Hydrogenation may be conducted utilizing a variety of hydrogenation catalysts such as nickel on kieselguhr, Raney nickel, copper chromate, molybdenum sulfide, and finely divided platinum or other noble metals on a low surface area carrier. Suitable hydrogenation processes which can be used include ones wherein the diene containing polymer or copolymer is dissolved in an inert hydrocarbon diluent such as cyclohexane and hydrogenated by reaction with hydrogen in the presence of a soluble hydrogenation catalyst. These kinds of hydrogenation processes are disclosed in U.S. Patent Nos. 3,113,986 and 4,226,952, the disclosures of which are incorporated herein by reference.

Hydrogenation may be conducted at any desired temperature or pressure, for example, from about atmospheric to about 3,000 p.s.i.g., the usual range being between about 100 and about 1,000 p.s.i.g. at temperatures from about 75° F. to about 600° F., for times between about 0.1 and about 24 hours, preferably between about 0.2 and about 8 hours. Preferred catalysts comprise the reduced metal products obtained by reduction of cobalt, nickel, tungsten or molybdenum compounds with aluminum alkyls or hydrides. These catalysts are selective, in that the diene block is hydrogenated rapidly, while the styrene blocks are more slowly hydrogenated unless hydrogenation temperatures are increased.

Since the polybutadiene block is most susceptible to oxidative attack, it is the primary objective of hydrogenation to reduce the unsaturation of the polybutadiene blocks to an amount of less than 10% of the original unsaturation with the hydrogenation of the terminal A blocks being of less importance. With some selective catalyst, this is readily accomplished, whereas with other catalysts, the hydrogenation proceeds along the entire chain. It is preferred that terminal A blocks not be hydrogenated. Furthermore, the low oil absorbance of the block polymer component having 18 to 34 mole percent of the butadiene units in the 1,2 configuration requires hydrogenation of the butadiene units to an unsaturation that is less than 5% of the original unsaturation, most preferably less than 2%, as measured by ozonolysis which is described in U.S. Pat. No. 3,965,019, incorporated herein by reference. Lower levels of unsaturation are expected to be required for the low 1,2 content component when higher amounts of the hydrogenated butadiene are in the 1,2 configuration.

A typical styrene-hydrogenated butadiene-styrene (S-EB-S) block copolymer within the invention has average block molecular weights of 10,000 - 125,000 - 10,000.

In Table 2 the performance of wire and cable coating formulations containing block copolymers with different chain branching in the midblocks is examined. An S-EB-S block copolymer having about 38 mole % of the butadiene units in the rubber midblock in the 1,2 configuration, is compared to S-EB-S block copolymers having approximately 25% of the butadiene units in the 1,2 configuration. The 38% 1,2 content polymer was made using 6% (of total solution) diethyl ether as the microstructure modifier, while the 25% 1,2 content polymers were made using 0.47% diethyl ether. The tensile strength of both block copolymer formulations having low chain branching, i.e. low 1,2 configuration in the midblocks, is markedly higher (by 63 to 83%) than that of the 38% 1,2 block copolymer formulation, even though the lower chain branching formulations have a lower molecular weight. Furthermore the same high elongation is retained.

TABLE 2

| Formulations, phr | | | |
|---|---|---|---|
| S-EB-S (38 mole %-1,2 configuration; mol. wt. 180 M) | 100 | — | — |
| Low branching polymer No. 1 (24.7 mole %-1,2 configuration; mol. wt. 156 M) | — | 100 | — |
| Low branching polymer No. 2 (25.2 mole %-1,2 configuration; mol. wt. 109 M) | — | — | 100 |
| Oil | 110 | 110 | 110 |
| Polypropylene | 50 | 50 | 50 |
| Resin, endblock compatible | 20 | 20 | 20 |
| Antioxidants, Fire Retardants | 3 | 3 | 3 |
| Total PHR | 283 | 283 | 283 |
| Physical Properties | | | |
| Tensile Strength, psi | 1750 | 2860 | 3200 |
| Elongation, % | 700 | 720 | 730 |

To prepare the novel block copolymer blends, about 20 to about 80 phr of the elastomeric block copolymer having 35 to 55 mole % of the butadiene units in the 1,2 configuration is added to about 80 to about 20 phr of the block copolymer having 18 to 34 mole % of the hydrogenated butadiene units in the 1,2 configuration. The preferred blends are elastomeric compositions having improved resistance to oil absorption and high tensile strength and contain from about 50 to 80 phr of the high 1,2 content block copolymer and from about 50 to about 20 phr of the low 1,2 content block copolymer. The blends exhibit less oil absorbance than expected, especially when blended with a polyolefin, such as high density polyethylene (HDPE), low density polyethylene (LDPE), linear low density polyethylene (LLDPE), or polypropylene (PP).

Additionally, other components may be added to the novel blend, such as up to about 125 phr oil, up to about 1500 phr filler, up to about 50 phr low mole weight polystyrene; and up to about 25 phr of a member of the group consisting of heat stabilizers, slip-agents, antioxidants, antistatic agents, colorants, flame retardants, plasticizers, preservatives, processing aids, and lubricants.

Other components may be added to the novel blend for numerous reasons, such as to lower manufacturing costs or to have ease in manufacturing. Typical oils usable within the scope of the invention include: various naphthenic and paraffinic extending oils, such as Shellflex ™ 371 or Penreco ™ 4434, and silicone oils.

The polystyrene which may be added to the novel blend is preferably anionic polystyrene (APS) and can be obtained from alkyl lithium catalyzed polymerization of styrene. Anionic polystyrene with a molecular weight which ranges from about 2,000 to about 20,000 is the most preferred additive. Alternatively, anionic polystyrene can be prepared according to the teachings in U.S. Pat. No. 4,117,037 and used within the scope of the invention. In addition, low molecular weight polystyrenes prepared by free radical mechanisms can be used.

In preparing the inventive blend, a variety of standard additives can be used to prepare the thermoplastic oil resistant composition. Typical examples of each additive include: dilaurylthiodipropionate as a conventional heat stabilizer; erucyl amide as a slip-agent; Irganox® 1010 (available from Ciba-Geigy of Hawthorne, N.Y.) as an antioxidant; Emerest® 2401 (available from Emery Chemicals of Cincinnati, Ohio) as an antistatic agent; titanium dioxide as a colorant; antimony oxide, Firebrake® 2B (available from Bate Chemical, Ltd. of Don Mills Ontario, Canada) and/or Dechlorane® +25 (available from Occidental Chemical Corp., Niagara Falls, NY) as flame retardants; Shellwax® 100 (available from the Shell Chemical Company of Houston, Texas) as a processing aid.

In a preferred embodiment, the components of the novel blend can include: 67 parts per hundred of the Kraton® G 1657, a commercially available S-EB-S block copolymer having a high mole percent of the hydrogenated butadiene units in a 1,2 configuration, 33 parts per hundred of an S-EB-S block copolymer having about 23 mole percent of the hydrogenated butadiene units in a 1,2 configuration, and 33 parts per hundred of a polyolefin, such as high density polyethylene (HDPE). The block copolymer having a 1,2 content of 23% was made using 0.9% (of total solution) diethyl ether as the micro-structure modifier and had a styrene block molecular weight of 9,800, an ethylene-butylene block molecular weight of 111,000, and a total styrene content of 11.9%. The components were mixed in a 260 cm³ capacity Brabender mixer using a rotor speed of 50 rpm, a body temperature of 200° C. and a mix time of 12 minutes. This blend composition is identified as formulation A in Table 3.

In an alternative embodiment, the components of the blend can include: 33 parts per hundred of the Kraton® G 1657 block copolymer, 67 parts per hundred of the block copolymer having about 23 percent of the hydrogenated butadiene units in a 1,2 configuration, and about 33 parts per hundred of a polyolefin, such as high density polyethylene (HDPE). This blend composition is identified as formulation B in Table 3.

In both formulations A and B, the S-EB-S block copolymer with about 23% of the hydrogenated butadiene units in the 1,2 configuration is a composition comprising: from about 85 to 100 percent by weight of at least one block copolymer having two endblocks A and a midblock B, wherein the A blocks are monoalkenyl arene polymer blocks and the B block is a substantially completely hydrogenated conjugated diene polymer block. A tri-block content as low as 55% by weight is expected to be useful in the previous invention. The compositions preferably have a number average molecular weight in the range from about 25,000 to about 200,000, with the number average molecular weight of the A blocks being in the range of from about 4,000 to about 35,000. It is also preferred that the monoalkenyl arene content of the copolymer in the range of from about 10 to about 35% by weight for the tri-block copolymer and the B blocks by hydrogenated to an unsaturation that is less than 2% of the original unsaturation.

The physical properties of formulations A and B can be compared to similar control formulations C and D wherein the block copolymer of control formulation C comprises 100% conventional Kraton® G 1657 block copolymer and the block copolymer of control formulation D comprises 100% of the S-EB-S block having about 23% of the hydrogenated butadiene units in the 1,2 configuration. Table 3, following, summarizes the compositions and physical properties of formulations A through D.

The results in Table 3 establish that the oil absorption of the block copolymer blends of the present invention is closer than expected to the oil absorption of the S-EB-S block copolymer component having the lower amount of the hydrogenated butadiene blocks in the 1,2 configuration. That is, the oil absorption of both Formulations A and B are unexpectedly closer to the oil absorption of Formulation D than to Formulation C.

TABLE 3

|  | A | B | C (Control) | D (Control) |
| --- | --- | --- | --- | --- |
| Formulation, phr |  |  |  |  |
| S-EB-S with 23.0% 1,2 configuration[1] | 33 | 67 | — | 100 |
| Kraton® G 1657X S-EB-S | 67 | 33 | 100 | — |
| Oil | 62.5 | 62.5 | 62.5 | 62.5 |
| APS, 4.5 M. mol. wt. | 10 | 10 | 10 | 10 |
| Wax | 10 | 10 | 10 | 10 |
| Irganox 1010 | 0.2 | 0.2 | 0.2 | 0.2 |
| DLTDP | 0.5 | 0.5 | 0.5 | 0.5 |
| Kemamide E | 0.5 | 0.5 | 0.5 | 0.5 |
| HDPE | 33 | 33 | 33 | 33 |
| TiO$_2$ | 0.5 | 0.5 | 0.5 | 0.5 |
| Total PHR | 217.2 | 217.2 | 217.2 | 217.2 |
| Properties |  |  |  |  |
| Hardness, Shore A | 69 | 73 | 54 | 78 |
| Oil Absorption, %[2] | 11 | 5 | 34 | 4 |

[1] Mol. wt. 145 M, polystyrene block mol. wt. 9,800; 11.9% total styrene content; S-EB diblock, <5%.
[2] Test time 16 hrs.

A comparison of the physical properties of a block copolymer blend of the present invention with a similar block copolymer that differs only in the degree of branching on the midblocks is provided in Table 4. Formulation E (comparison) in Table 4 is a control formulation containing 67 phr of the Kraton® G 1657 S-EB-S block copolymer and 33 phr of an S-EB-S block copolymer containing 38.5% 1,2 configuration (made using 6% diethyl ether). Formulation F in Table 4 replaces the Kraton® G 1657 block copolymer in Formulation E with 67 phr of a S-EB-S block copolymer made using 0.47% diethyl ether and having about 25% of the hydrogenated butadiene blocks in the 1,2 configuration, i.e., within the invention. As indicated in Table 4, Formulation F has remarkably improved Tensile Strength and resistance to oil absorption in comparison to Formulation E.

TABLE 4

| Formulation, phr | E (Control) | F |
|---|---|---|
| S-EB-S with 25.4% 1,2 configuration[1] | — | 67 |
| Kraton ® G 1657X S-EB-S | 67 | — |
| S-EB-S with 38.5% 1,2 content[2] | 33 | 33 |
| Penreco 4434 oil | 50 | 50 |
| APS, 4.5 M mol. wt. | 10 | 10 |
| Shellwax 100 | 10 | 10 |
| Irganox 1010 | 0.2 | 0.2 |
| DLTDP | 0.5 | 0.5 |
| Kemamide E | 0.5 | 0.5 |
| Total PHR | 171.2 | 171.2 |
| Hardness, Shore A | 35 | 67 |
| Oil Absorption, % | 58 | 19 |
| Tensile Strength, psi | 270 | 2450 |
| Elongation, % | 610 | 870 |
| Modulus at 100%, psi | 75 | 230 |
| Modulus at 300%, psi | 120 | 320 |
| Modulus at 500%, psi | 200 | 680 |

[1]Total mol. wt. 86 M; polystyrene block mol. wt. 5,600; total styrene content, 13.3%; S-EB diblock, 20%-made with 0.47% diethyl ether in polymerization as micro-structure modifier.
[2]Total mol. wt. 50 M; polystyrene block mole wt. 7,200; total styrene content, 30%; S-EB diblock content, <5%.

The present invention is further illustrated by another composition which is identified as Formulation G in Table 5.

The low 1,2 content component of the present invention also exhibits improved oil resistance and tensile strength when combined with S-B-S block copolymers that are not hydrogenated. Table 6 presents the compositions and physical properties for Formulations H, I, and J which consist of 100% low 1,2 content S-B-S; 50% high 1,2 content S-EB-S/50% low 1,2 content S-B-S; and 50% low 1,2 content S-B-S/50% low 1,2 content S-EB-S; respectively. Formulation J which is prepared in accordance with the present invention exhibited much lower oil absorption and higher tensile strength than the all S-B-S low 1,2 content polymer or the blend of S-B-S low 1,2 content polymer with S-EB-S high 1,2 content polymer.

The improvements in oil resistance and tensile strength afforded by blends of the high and the low 1,2 content block copolymers are thought to be due to the enhanced formation of crystalline regimes in the midblock phase coming from the low 1,2 content component. Crystals result from relatively long sequences of 1,4 addition polymer, which are equivalent to polyethylene (after hydrogenation), a polymer of high crystallinity. The crystals have poor solubility in various solvents, including oil. In addition, they provide a self-reinforcing character to the midblock polymer, giving high tensile strengths. Thus, the low 1,2 polymers are able to express good reinforcement in a variety of matrices (i.e., when blended with various other polymers) including high 1,2 S-EB-S polymers and S-B-S polymers regardless of 1,2 configuration, and are expected to have some utility in improving the oil resistance and tensile strength of S-I-S (styrene-isoprene-styrene) polymers and S-EP-S (styrene-hydrogenated isoprene-styrene) polymers.

TABLE 5

| Formulation, phr | G |
|---|---|
| S-EB-S with 38.5% 1,2[1] | 67 |
| S-EB-S block copolymer with 25.4% 1,2 configuration[2] | 33 |
| Oil | 37.7 |
| Hydrocarbon resin[3] | 13.5 |
| Endblock resin[4] | 13.5 |
| A0330 | 0.2 |
| Total PHR | 164.9 |
| Properties | |
| Hardness, Shore A | 58 |
| Oil Absorption, % | 43 |
| Tensile at Break, psi | 2125 |
| % Elongation | 800 |
| Stress-Strain, psi (at 75° F.) | |
| @ 100% MOD | 200 |
| @ 200% MOD | 400 |
| @ 300% MOD | 825 |

[1]Total mol. wt. 50 M; polystyrene block mole wt., 7,200; total styrene content 30%; S-EB diblock, <5%-made with 6% diethyl ether in polymerization as microstructure modifier.
[2]Total mol. wt. 86 M; polystyrene block mol. wt., 5,600; total styrene content, 13.3%; S-EB diblock 20%-made using 0.47% diethyl ether in polymerization as microstructure modifier.
[3]Soft pt. 125° C.; compatible with EB block.
[4]Compatible with polystyrene blocks.

TABLE 6

| Formulation, phr | H (Control) | I (Control) | J |
|---|---|---|---|
| S-B-S[1] with 10% 1,2 content | 100.0 | 50.0 | 50.0 |
| Kraton ® G 1657 S-EB-S with high 1,2 content[2] | — | 50.0 | — |
| S-EB-S w/25.4% 1,2 content[3] | — | — | 50.0 |
| LDPE | 7.0 | 7.0 | 7.0 |
| Oil | 21.0 | 21.0 | 21.0 |
| Resin, 115° C. soft pt. | 31.0 | 31.0 | 31.0 |
| Antioxidants | 0.8 | 0.8 | 0.8 |
| Total phr | 159.8 | 159.8 | 159.8 |
| Hardness, Shore A (10 sec.) | 48 | 39 | 55 |
| Oil Absorption, 16 hr, % | 41 | 67 | 26 |
| Tensile Strength, psi | 710 | 430 | 2180 |
| Elongation at Break, % | 950 | 900 | 800 |
| Modulus at 100%, psi | 120 | 90 | 160 |
| Modulus at 300%, psi | 145 | 120 | 260 |
| Modulus at 500%, psi | 215 | 190 | 435 |
| Set, % | 25 | 20 | 60 |

[1]80,000 total mol. wt.; 28% polystyrene blocks; 1,2 content, 10%; S-B diblock, 20%; no microstructure modifier was used in polymerization.
[2]83,000 total mol. wt.
[3]86,000 total mol. wt.; 13% polystyrene blocks; 1,2 content, 25.4%; contains 20% S-EB diblock; 0.47% diethyl ether was used in polymerization as microstructure modifier.

We claim:
1. A thermoplastic blend, comprising:
   (a) about 80 to about 20 parts by weight of an elastomeric block copolymer having the general configuration A-B-A, wherein:
      (i) each A block is a polymerized monoalkenyl aromatic hydrocarbon block having an average molecular weight of about 4000 to about 115,000;
      (ii) the A blocks, in combination, comprise about 5 to about 35w% of the elastomeric block copolymer; and
      (iii) each B block is a non-hydrogenated butadiene hydrocarbon block consisting of 8 to 55 mole percent condensed butadiene units in the 1,2 configuration, or a hydrogenated butadiene hydrocarbon block consisting of 35 to 55 mole percent condensed butadiene units in the 1,2 configuration, and said B block has an average molecular weight of between about 20,000 and about 450,000; and
   (b) about 20 to about 80 parts by weight of a block copolymer having the general configuration A-B-A wherein:

(i) each A block is a polymerized monoalkenyl aromatic hydrocarbon block having an average molecular weight of about 4000 to about 115,000;

(ii) said A blocks, in combination, comprise about 5 to about 35 w % of the block copolymer;

(iii) each B block is a polymerized butadiene hydrocarbon block consisting of about 18 to 34 mole percent condensed butadiene units in the 1,2 configuration, and said B block has an average molecular weight of between about 20,000 and about 450,000; and (iv) the B blocks are hydrogenated to an unsaturation that is less than about 5% of the original unsaturation.

2. The thermoplastic blend of claim 1, further comprising from about 0.001 to about 50 phr of a polyolefin.

3. The thermoplastic blend of claim 2, wherein said polyolefin is a high density polyethylene.

4. The thermoplastic blend of claim 1, wherein the blend comprises about 80 to about 50 phr of the elastomeric block copolymer from (a) and about 20 to about 50 phr of the block copolymer from (b).

5. The thermoplastic blend of claim 1, wherein the molecular weight of each block is from about 4,000 to about 35,000, the molecular weight of each B block is from about 20,000 to about 200,000, and the unsaturation of the B blocks for the block copolymer from (b) is less than 2% of the original unsaturation.

6. The thermoplastic blend of claim 1, wherein the block copolymer from (b) has from about 21 to about 31 mole percent condensed butadiene units in the 1,2 configuration.

* * * * *